(12) United States Patent
Delattre et al.

(10) Patent No.: US 9,423,953 B2
(45) Date of Patent: Aug. 23, 2016

(54) EMULATING PRESSURE SENSITIVITY ON MULTI-TOUCH DEVICES

(71) Applicant: INTERNATIONAL BUSINESS MACHINES CORPORATION, Armonk, NY (US)

(72) Inventors: Jerome Delattre, Antibes (FR); Stephane Hillion, Antibes (FR); Thierry Kormann, Valbonne (FR); Remi Van Keisbelck, Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/158,918

(22) Filed: Jan. 20, 2014

(65) Prior Publication Data

US 2014/0210742 A1    Jul. 31, 2014

(30) Foreign Application Priority Data

Jan. 30, 2013  (GB) .................................. 1301594.6

(51) Int. Cl.
*G06F 3/041* (2006.01)
*G06F 3/0488* (2013.01)
*G06F 3/0484* (2013.01)

(52) U.S. Cl.
CPC ........ *G06F 3/04883* (2013.01); *G06F 3/04847* (2013.01); *G06F 2203/04808* (2013.01)

(58) Field of Classification Search
CPC .. G06F 3/04847; G06F 3/04883; G06F 3/041
See application file for complete search history.

(56) References Cited

U.S. PATENT DOCUMENTS

| 5,488,204 | A  | 1/1996  | Mead et al.      |
|-----------|----|---------|------------------|
| 6,002,389 | A  | 12/1999 | Kasser           |
| 6,788,297 | B2 | 9/2004  | Itoh et al.      |
| 7,653,883 | B2 | 1/2010  | Hotelling et al. |
| 7,656,394 | B2 | 2/2010  | Westerman et al. |
| 7,817,159 | B2 | 10/2010 | Schuster et al.  |
| 7,924,271 | B2 | 4/2011  | Christie et al.  |

(Continued)

FOREIGN PATENT DOCUMENTS

| EP | 1852774 A2 | 11/2007 |
|----|------------|---------|
| EP | 2426585 A2 | 3/2012  |
| EP | 2503441 A1 | 9/2012  |

OTHER PUBLICATIONS

UK Intellectual Property Office: Search Report for GB Application No. 1301594.6, Mailed Aug. 6, 2013.

(Continued)

*Primary Examiner* — Tony N Ngo
(74) *Attorney, Agent, or Firm* — Law Office of Jim Boice

(57) ABSTRACT

A method, device, and/or computer program product operates a touch-screen device. A first touch at a location on a touch-screen is detected. A second touch on the touch-screen, which occurs simultaneously with the first touch on the touch-screen, is detected. A pressure of the detected second touch is calculated and assigned to the detected first touch. A specific touch-screen output is generated according to the location and assigned calculated pressure of the detected first touch.

15 Claims, 6 Drawing Sheets

(56) References Cited

U.S. PATENT DOCUMENTS

| | | |
|---|---|---|
| 7,956,847 B2 | 6/2011 | Christie |
| 8,269,729 B2 | 9/2012 | Han et al. |
| 2005/0275622 A1 | 12/2005 | Patel et al. |
| 2006/0238519 A1* | 10/2006 | Westerman et al. .......... 345/173 |
| 2007/0152984 A1 | 7/2007 | Ording et al. |
| 2009/0213083 A1 | 8/2009 | Dicker et al. |
| 2010/0156818 A1 | 6/2010 | Burrough et al. |
| 2011/0122080 A1 | 5/2011 | Kanjiya |
| 2012/0188181 A1 | 7/2012 | Ha et al. |

OTHER PUBLICATIONS

S. Hwang et al., "MICPEN: Pressure-Sensitive Pen Interaction Using Microphone With Standard Touchscreen", ACM, CHI 2012, pp. 1-6.

"A Method to Implement Pressure-Sensitive Control by Measuring the Touch Area of Finger on the Screen", ip.com, IPCOM000209536D, Aug. 9, 2011, pp. 1-5.

International Searching Authority, International Search Report and Written Opinion for International Application No. PCT/IB2013/058155, Mailed Feb. 27, 2014.

\* cited by examiner

EMULATING PRESSURE SENSITIVITY ON MULTI-TOUCH DEVICES

This application is based on and claims the benefit of priority from United Kingdom (GB) Patent Application 1301594.6, filed on Jan. 30, 2013, and herein incorporated by reference in its entirety.

BACKGROUND

This invention relates to a method of operating a touch-screen device and to a touch-screen device. The invention provides a system and method for emulating pressure sensitivity on multi-touch devices.

Graphics tablets are commonly used for creating digital drawings. Graphics tablets, because of their stylus-based interface, have the ability to distinguish applied user pressure. The pressure-sensitivity can be used to control line thickness, opacity, and/or colour, for example. There are similarities between multi-touch devices such as modern smartphones or tablet computers and graphics tablets, and it is tempting to think of using a phone or tablet and fingers, instead of a graphics tablet and a stylus. Several drawing/painting applications already exist for popular touch-screen devices that are based on this principle.

The main drawback expressed by graphic designers when using such touch-based devices today is the lack of pressure detection in devices such as smartphones and tablet computers. Current devices such as mobile phones and tablet computers do not have a pressure sensitive multi-touch surface, and therefore cannot perform pressure detection, unlike graphics tablets. An existing solution is to associate an additional device to the multi-touch device, for example a stylus. Several types of stylus exist today that are compatible with multi-touch devices, but very few of them are sufficiently accurate at passing pressure information back through the stylus to the device. All such additional devices suffer from the same drawbacks: an additional cost, the divergence from the basic user experience that uses fingers for everything, and implementation issues involved in trying to track the size of a touch since the feature is not always possible, permitted, or documented on certain devices.

To control line thickness, another solution has been identified, which consists of drawing lines at a fixed weight and reshaping the lines by erasing some parts. The drawback of this technique is that this is a laborious task for all but the most simplest of drawings. The technique requires the reworking of each line, possibly in different layers to avoid unwanted erasing. This approach only works to control line thickness, and is not suitable for other attributes such as opacity or colour.

SUMMARY

A method, device, and/or computer program product operates a touch-screen device. A first touch at a location on a touch-screen is detected. A second touch on the touch-screen, which occurs simultaneously with the first touch on the touch-screen, is detected. A pressure of the detected second touch is calculated and assigned to the detected first touch. A specific touch-screen output is generated according to the location and assigned calculated pressure of the detected first touch.

BRIEF DESCRIPTION OF THE SEVERAL VIEWS OF THE DRAWINGS

Preferred embodiments of the present invention will now be described, by way of example only, with reference to the following drawings, in which.

DETAILED DESCRIPTION

Figure 1:
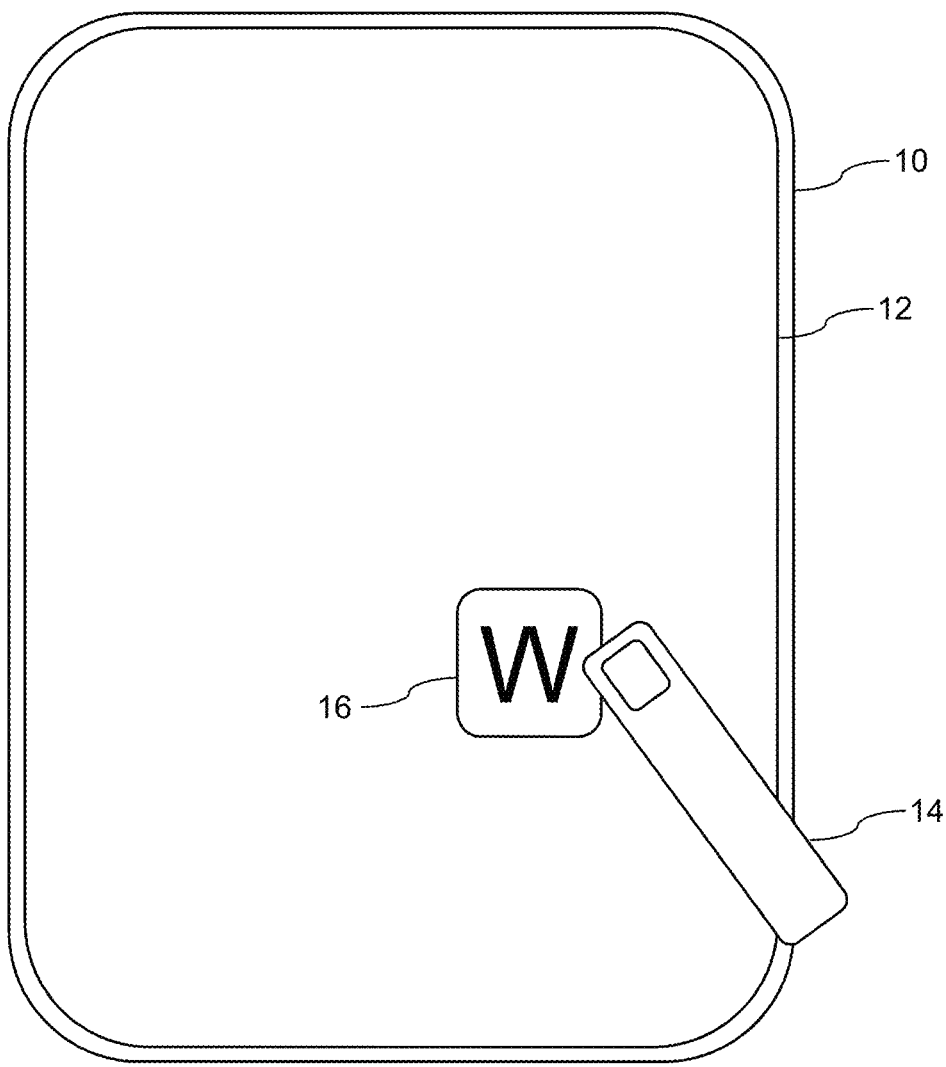
FIG. 1 is a schematic diagram of a touch-screen device.

FIG. 1 shows a touch-screen device 10, which is provided with a touch-screen 12 that comprises almost the entirety of the front surface of the touch-screen device 10. The device 10 could be a tablet computer or a smartphone that provides processing and network connectivity (for example using Wi-Fi). The user of the device 10 interacts with the touch-screen 12 using their finger 14. The touch-screen 12 has display capability and will display icons and applications. A single icon 16 is shown to illustrate the concept. The user selects an icon 16 by touching the touch-screen 12 in the location of the displayed icon 16. The icon will launch the appropriate application, once touched.

The touch-screen device 10 is a multi-touch device, meaning that the touch-screen 12 is able to detect the presence of more than one touch at the same time. Simultaneous touches by the user on the touch-screen 12 will be detected by the touch-screen 12 of the device 10. This means that a user can use more than one finger 14 when interacting with the touch-screen 12, depending upon the application being used at the time. A drawing application, for example, will allow the user to draw simultaneously on different parts of the touch-screen 12 at the same time, using multiple fingers 14. Each individual touch of a finger 14 on the touch-screen 12 will be recognised.

The touch-screen 12 of the device 10 cannot detect the amount of pressure that is used when a user's finger 14 (or any other device such as a stylus) is used to touch the touch-screen 12. The nature of the device 10, in contrast to a high-end graphics tablet, is such that the amount of pressure exerted by a user's finger 14 on the touch-screen 12 is not measured. The design of the touch-screen 12 is such that it can detect the touch of a finger 14 (or other pointing device) anywhere on the touch-screen 12 and indeed multiple simultaneous touches are detected by the touch-screen 12, but the amount of pressure used in any of the touched is not captured.

However, the device 10 is configured so that it is possible to emulate pressure sensitivity in the touch-screen 12, without the need to alter the hardware configuration of the touch-screen 12 and without the need to use any extra devices, such as a stylus that would measure the pressure used. The emulation of the pressure sensitivity is achieved by using the multi-touch functionality of the touch-screen 12. Multiple touches are used simultaneously by the user to indicate the amount of pressure that is intended by the user. This is best illustrated in the context of a drawing application, where the amount of pressure is indicative of the thickness of a line that a user wishes to draw.

Figure 2:
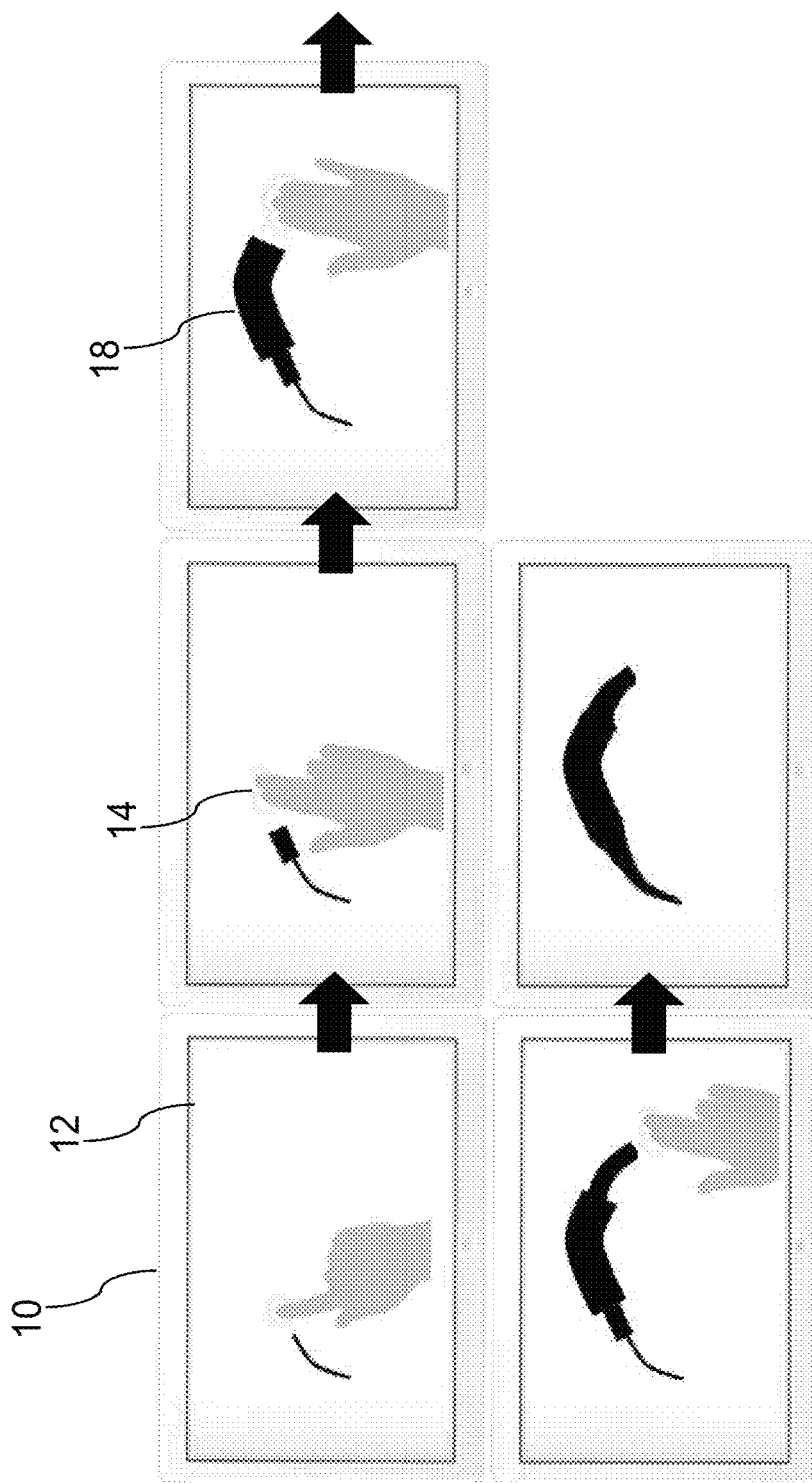
FIG. 2 is a series of views of the touch-screen device.

FIG. 2 shows a first embodiment of the invention, where the user is drawing a line 18 using their finger 14. This figure shows five different views of the same device 10 as the user is using their fingers 14 to touch the screen 12 to draw a line 18. As the user adds further fingers 14 of their hand to the drawing action that they are making, thereby increasing the magnitude of the touch on the touch-screen 12, the thickness of the line 18 increases. When the user reduces the number of fingers 14, then a corresponding decrease in the thickness of the line 18 occurs. Essentially the first touch on the touch-screen 12 by the user's finger 14 is the "pencil" that determines the location of the drawing stroke and any subsequent, additional, simultaneous touches increase the emulated pressure.

The device 10 detects a first touch on the touch-screen 12 and detects a second touch on the touch-screen 12, the second touch occurring simultaneously with the first touch on the touch-screen 12. The emulated pressure is calculated from the second touch and that emulated pressure calculation is then assigned to the first touch on the touch-screen 12. In this way a user can use the multi-touch functionality of the touch-screen 12 to emulate a pressure sensitivity in the touch-screen device 10. In the embodiment of FIG. 2, the calculation of a pressure from the detected second touch comprises generating the calculated pressure from the magnitude of the second touch.

Figure 3:
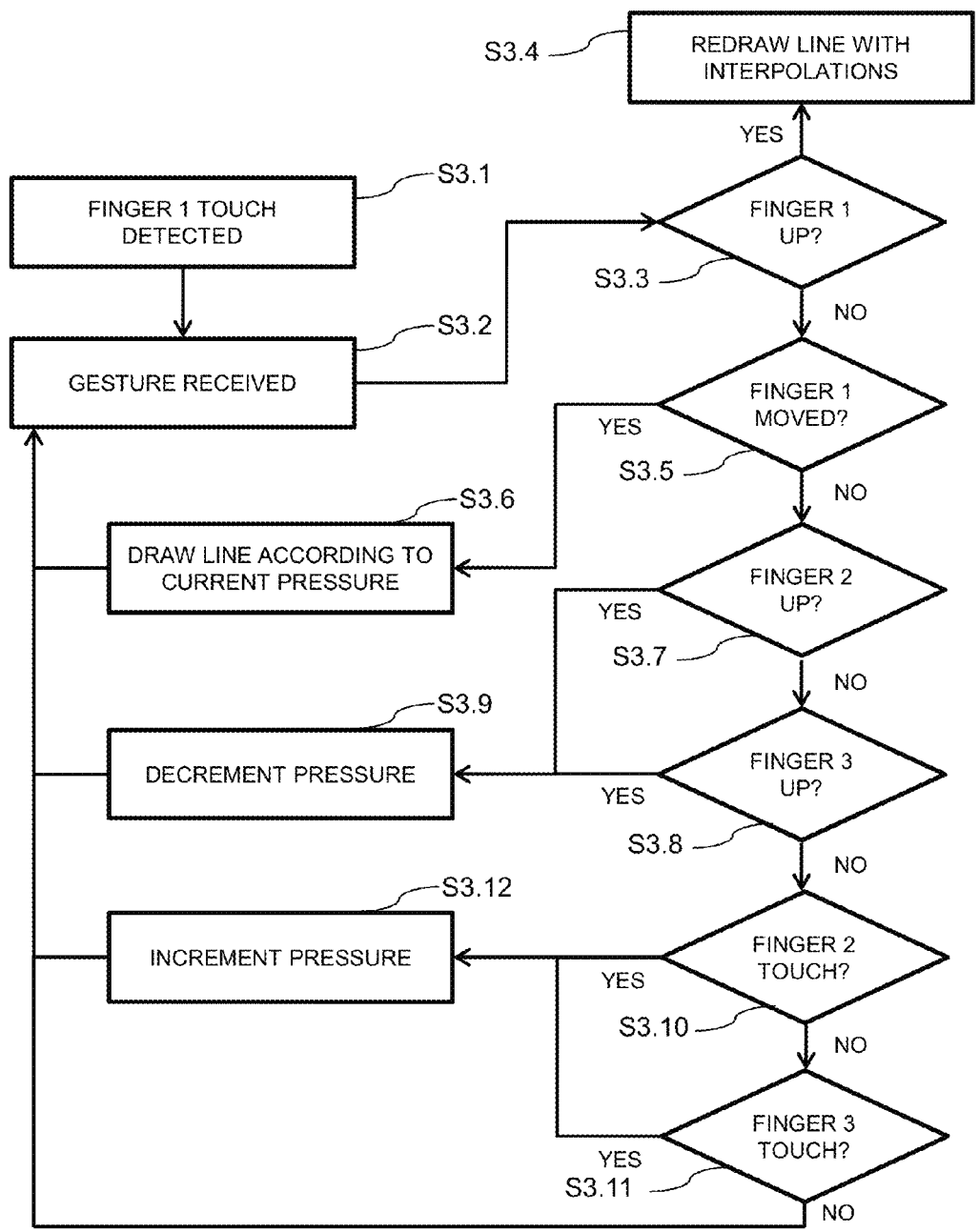
FIG. 3 is a flowchart of a method of emulating pressure on the touch-screen device.

FIG. 3 shows a flowchart which illustrates how the touch-screen device 10 computes the level pressure and draws a line 18 of different weights, when considering the use of only three fingers 14 of one hand. Once the touch of the user's first finger 14 has been detected (S3.1), the status "gesture received" is generated (S3.2) and a check is made (S3.3) to see if the first finger 14 is up, i.e. that it is no longer touching the touch-screen 12. If this is the case, then the method terminates by redrawing the line 18 generated with the necessary interpolations (S3.4). If the first finger 14 is not up, i.e. it is still in contact with the touch-screen 12, then the next check is made.

This check is to see if the first finger 14, which is effectively the user's "pencil" in the drawing application, has moved (S3.5). If the answer is yes, then the device 10 will continue drawing the line 18 according to the current pressure (S3.6) and the method returns to the "gesture received" box (S3.2) and cycles through the checks once again. If the first finger 14 has not moved, then the method performs consecutive checks to see whether the second (S3.7) and third (S3.8) fingers have been lifted up from the touch-screen 12, if they had been in contact with the touch-screen 12. If the answer is yes to either check, then the current pressure is decremented (S3.9) and the method returns to the "gesture received" box (S3.2).

If neither of the second and third fingers has been lifted up, then the method performs consecutive checks to see whether the second (S3.10) and third (S3.11) fingers have been placed into contact with the touch-screen 12, thereby increasing the magnitude of the user's contact with the touch-screen 12. If the answer is yes to either check, then the current pressure is incremented (S3.12) and the method returns to the "gesture received" box (S3.2). The method continues to cycle through the check boxes to monitor the contact of the user's fingers with the touch-screen 12, until the original first finger that touched the touch-screen 12 has been lifted up (S3.3), at which point the method terminates by redrawing the line 18 generated with the necessary interpolations (S3.4).

Figure 4:
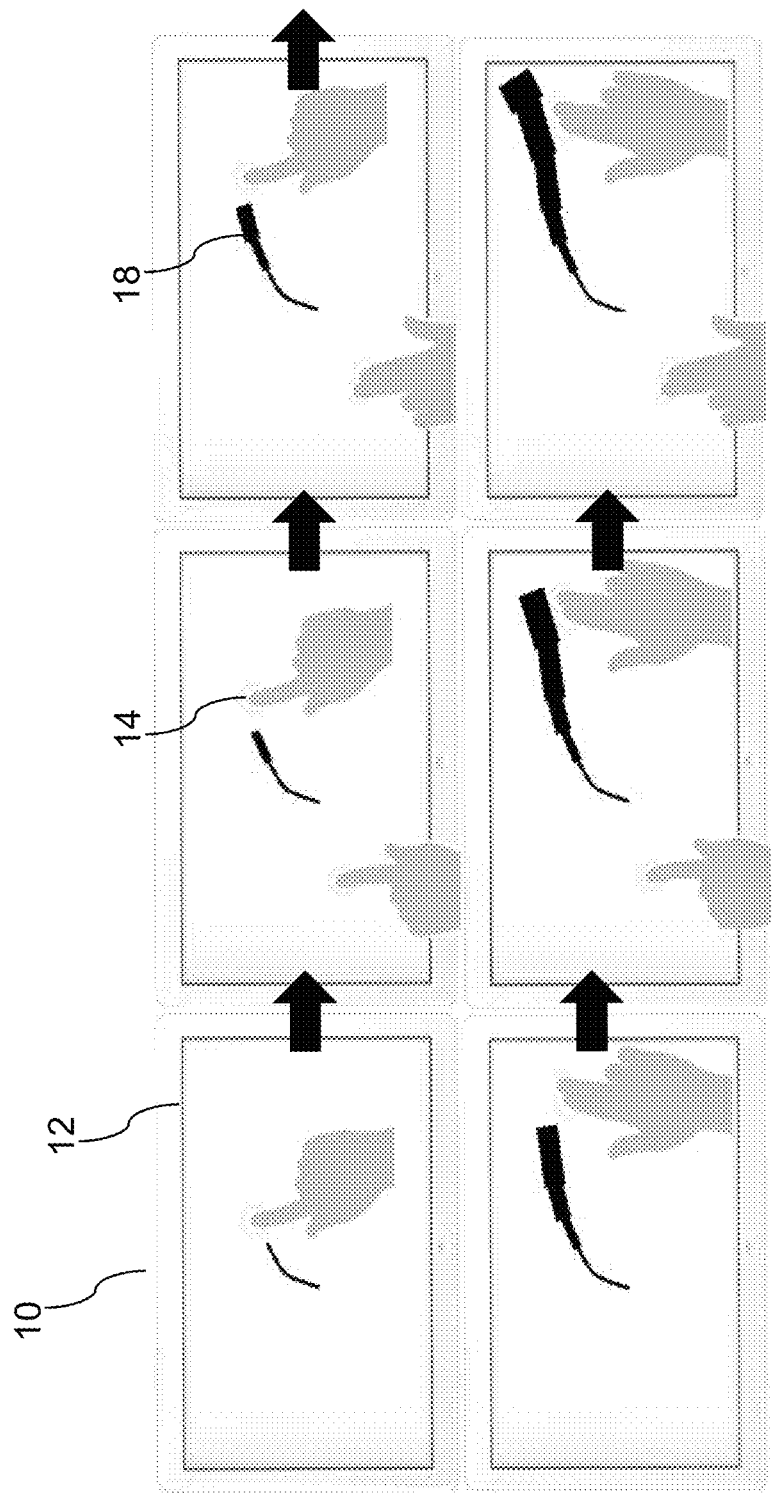
FIG. 4 is a further series of views of the touch-screen device.

FIG. 4 shows a second embodiment of the pressure emulation, which also relies on the magnitude of the second touch in order to decide on the amount of pressure that will be emulated. The embodiment of FIG. 4 differs from that of FIG. 2 in that the user is able to use both of their hands to generate the touches on the touch-screen 12. The first touch is still considered to be that of the "pencil", which determines the location of the actual drawing line 18 that is being generated on the touch-screen 12. The second touch, which is simultaneous with the first touch, is of one or more fingers 14 of the user's other hand.

The magnitude of the pressure that is being emulated is determined by the magnitude of the second touch, so as the user adds more fingers 14 to the subsequent touches, the size of the pressure emulated will increase and the thickness of the line 18 being generated is therefore increased. As can be seen in this figure, the user first starts drawing with one finger 14 of their right hand and then touches the screen with one finger 14 of their left hand (anywhere on the touch-screen 12). This second touch emulates a higher pressure and the line 18 being drawn is made thicker. As the user adds a second finger 14 of their left hand, the line 18 becomes thicker still.

The user can combine additional touches from other fingers 14 of the right hand with or without touches of fingers 14 of the left hand, as shown in the lower three views of FIG. 4. This can be used to emulate different pressure levels according to a predefined scheme. The different combinations of fingers 14 from different hands can provide a multitude of different pressure levels. Using five fingers per hand, the general formula to get a total of 30 possible pressure levels is:

$$\text{Pressure level} = (A*(C-1))+B$$

where A is the chosen maximum number of fingers involved on one hand (the default is five), B is the number of fingers involved to refine the sensitive pressure (left hand by default) and C is the number of fingers of the hand used to draw the line (right hand by default).

The table below indicates how using three fingers on each hand can be used to generate twelve different pressure levels, as per the formula shown above:

| Number of fingers of left hand touching the screen | Number of fingers of right hand touching the screen | Pressure level |
| --- | --- | --- |
| 0 | 1 | 1 |
| 1 | 1 | 2 |
| 2 | 1 | 3 |
| 3 | 1 | 4 |
| 0 | 2 | 5 |
| 1 | 2 | 6 |
| 2 | 2 | 7 |
| 3 | 2 | 8 |
| 0 | 3 | 9 |
| 1 | 3 | 10 |
| 2 | 3 | 11 |
| 3 | 3 | 12 |

Figure 5:
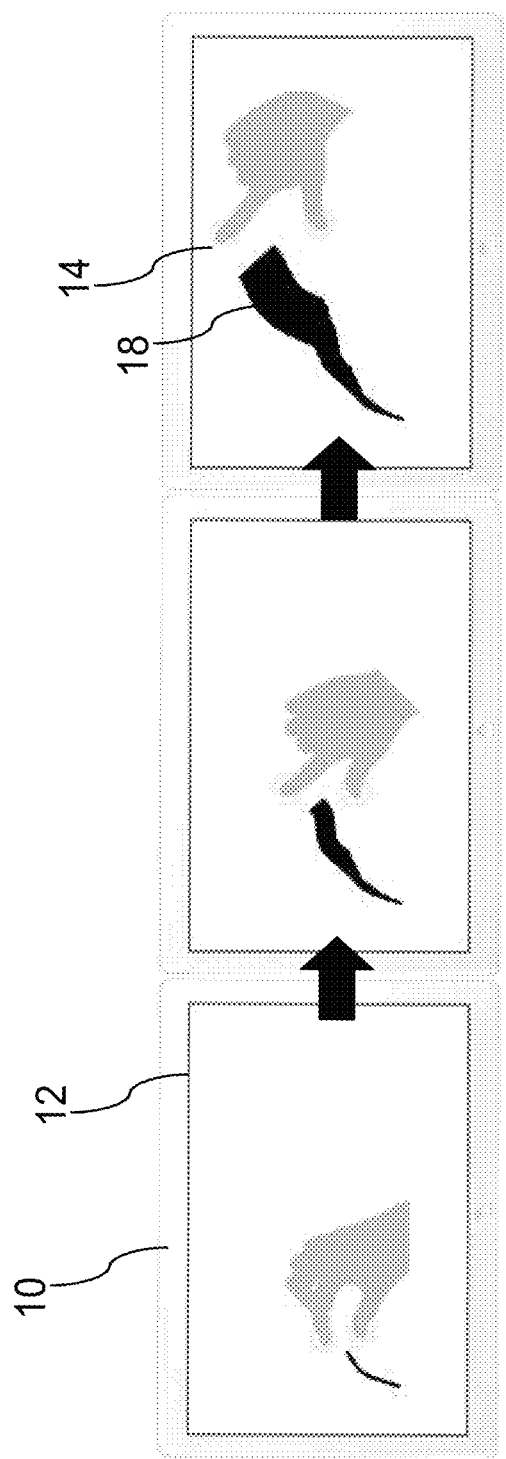
FIG. 5 is a yet further series of views of the touch-screen device.

A third embodiment of the pressure emulation in the touch-screen device 10 is shown in FIG. 5. In this embodiment, the use of a continuous gesture is supported. This gesture is particularly useful when considering the need to control the pressure level with continuous values, rather than with a discrete set of levels. The pressure level is proportional to the amount of space between the user's two fingers 14. The closer the fingers 14 are together, the smaller the value assigned to the emulated pressure, and as the user's fingers 14 move apart, the emulated pressure value increases. Two fingers 14 kept pressed close together represent a pressure level of zero.

As before, the first touch of the user's finger 14 on the touch-screen 12 defines the "pencil" which starts the drawing of the line 18 on the touch-screen 12. The second touch, which is simultaneous to the first touch, is used to generate the emulated pressure value. Rather than determining the magnitude of the second touch, the device 10 is generating the calculated pressure from the distance of the second touch from the first touch. As this distance changes, the device 10 will continually recalculate the emulated pressure value from the distance measurement. This allows a user to exercise a relatively fine control of the pressure emulation provided by the touch-screen device 10.

In FIG. 5, the line 18 being drawn by the user's first finger 14 will start by having a thickness that corresponds to a default thickness, essentially an emulated pressure value of 1. This is shown in the left-hand view of FIG. 5. The user then touches the touch-screen 12 with their thumb as the second touch on the touch-screen 12. The distance of the second touch from the first touch is measured and the pressure value is increased according to the size of the measured distance. This is shown in the middle view of FIG. 5. The user can then continue to draw their line 18 with the finger and thumb, increasing the gap between the two, as shown in the right-hand view of FIG. 5.

Figure 6:
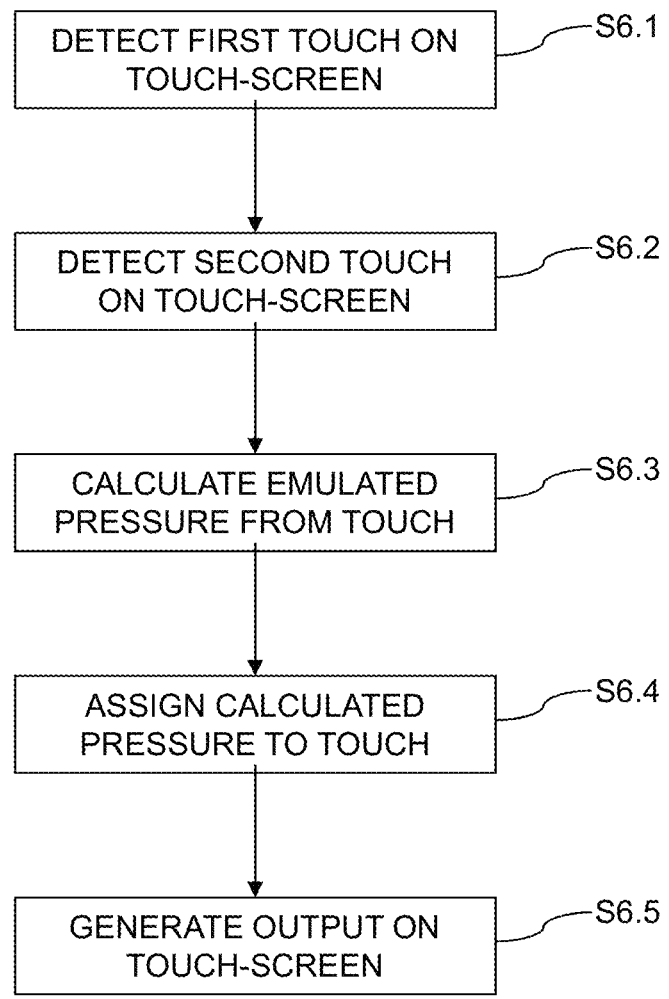
FIG. 6 is a flowchart of a method of operating a touch-screen device.

The method of operating the touch-screen device 10 is summarized in FIG. 6. The method defines the five steps that will be taken by the processor of the touch-screen device 10. This processor is connected to the touch-screen 12 and is arranged to control the operation of the device 10 under the control of instructions of a computer program product. The first step of the method is step S6.1, which comprises detecting the first touch on the touch-screen 12. While the above embodiments of the invention were described in the context of a drawing application to illustrate the application of the emulated pressure to line thickness, any application which requires user touch could use the method.

The next step of the method is step S6.2, which comprises detecting a second touch on the touch-screen 12, the second touch occurring simultaneously with the first touch on the touch-screen 12. The second touch is assumed to be made with a different finger or thumb than was used to make the first touch by the user. The second touch can be located anywhere on the touch-screen 12, and the suitability of the usable area will depend upon the construction of the application that is currently being used. The same hand of the user can be used to make the second touch or the user's other hand could be used for the second touch.

The next step of the method is step S6.3, which comprises calculating a pressure from the detected second touch, and then at step S6.4, assigning the calculated pressure to the detected first touch. The calculation of the emulated pressure could come from calculating the magnitude of the second touch, for example or from the distance between the first and second touch, as described in the embodiments above. The final step of the method is step S6.5, which comprises generating a specific touch-screen output according to the location and assigned pressure of the detected first touch. The touch-screen device 10 will then perform the appropriate action in response to the user's touches, using the emulated pressure value.

The step of calculating a pressure from the detected second touch can comprise selecting a pressure level from a set of predefined pressure levels. The generation of the emulated pressure value could use a discrete stepping of levels or could use a continuous scale, depending upon the application being used and the level of fine control that is needed by the user. The touch-screen device 10 will further detect any change in the nature of the second touch on the touch-screen 12 and will re-calculate the pressure from the changed second touch. As the user changes the second touch, then this will change the value that has been assigned to the emulated pressure value.

Thus, as presented herein and according to a first aspect of the present invention, there is provided a method of operating a touch-screen device, the method comprising the steps of detecting a first touch on the touch-screen, detecting a second touch on the touch-screen, the second touch occurring simultaneously with the first touch on the touch-screen, calculating a pressure from the detected second touch, assigning the calculated pressure to the detected first touch, and generating a specific touch-screen output according to the location and assigned pressure of the detected first touch.

According to a second aspect of the present invention, there is provided a touch-screen device comprising a touch-screen and a processor connected to the touch-screen, the processor arranged to detect a first touch on the touch-screen, detect a second touch on the touch-screen, the second touch occurring simultaneously with the first touch on the touch-screen, calculate a pressure from the detected second touch, assign the calculated pressure to the detected first touch, and generate a specific touch-screen output according to the location and assigned pressure of the detected first touch.

According to a third aspect of the present invention, there is provided a computer program product on a computer readable medium for operating a touch-screen device, the product comprising instructions for detecting a first touch on the touch-screen, detecting a second touch on the touch-screen, the second touch occurring simultaneously with the first touch on the touch-screen, calculating a pressure from the detected second touch, assigning the calculated pressure to the detected first touch, and generating a specific touch-screen output according to the location and assigned pressure of the detected first touch.

Owing to the invention, it is possible to provide a system and method for implementing gestures with touch sensitive devices (such as touch sensitive display) for emulating pressure sensitivity on a computing device or system. Specifically, gestural inputs of a human hand over a touch/proximity sensitive device can be used to control such things as line thickness, opacity, or hue. The invention has several practical advantages over existing systems including: no additional cost, since there is no need to buy any additional device such as a stylus; common touch events, since only standard touch events are required to implement the gestures; space is saved, since no external stylus is required, other than a user's finger; less intrusive, since using touch is silent and less distracting than typing or clicking on a screen and there is no need to or pick up a pen; natural and intuitive, since everyone knows that scratching a surface with several fingers makes a bigger trace than doing it with one finger.

The simulation of pressure sensitivity requires an adequate handling of touch events occurring when the user interacts with the touch-screen device. The touch sensing surface of such devices has the ability to recognize the presence of multiple points of contact with the surface. This plural-point awareness is used to implement pressure levels. The basic principle is to consider the first finger touching the screen as the pencil and any additional fingers touching the screen as indicators of the actual pressure level. This can be implemented in a variety of different ways.

A first set of gestures can be used that only requires one hand. The first finger which hits the screen represents the pencil. Any additional finger touching the screen after the first increases the pressure level. When removing one finger other than the one which represents the pencil, the pressure level is decreased. In order to get a better result, the touch-screen device can optionally make an interpolation between pressure levels; either each time a finger is added or removed from the surface, or at the end of the process. Two hands can be used and provide a total of nine different pressure levels. The placement of the pressure detection touches is arbitrary once the first finger has been determined as the pencil. Any other fingers only serve to control the pressure level.

Using the ten fingers of the human hands and by combining fingers of both hands, it is possible to support more pressure levels. Multiplicative gesture can be used as a second set of gestures that involves two hands in order to obtain even more pressure levels. The first finger which hits the touch-screen still represents the pencil. When a finger from the left hand hits the surface, the pressure level is increased. The more fingers, the higher the pressure level is. Fingers from the left hand represent intermediate steps between the number of fingers of the right hand and the number of fingers of the right hand plus one.

Since the first finger is consider as the pencil (no matter which hand landed on the surface), the other hand is used for controlling intermediate pressure levels. Consequently, a left-handed person can draw using the left hand and change the pressure using the right hand. Considering the use of five fingers per hand, the general formula to get a total of 30 possible pressure levels is: pressure level=$(A*(C-1))+B$, where A is the chosen maximum number of fingers involved on one hand (the default is five), B is the number of fingers involved to refine the sensitive pressure (left hand by default) and C is the number of fingers of the hand used to draw the line (right hand by default). In order to avoid uncomfortable positions while drawing, the system works better (even if it is not mandatory) when the hand used to control the pressure level is placed at the opposite corner to the direction the main hand will go. Hand differentiation can also be made by evaluating the distance between the pencil finger and the others.

A third embodiment is the use of continuous gesture. This gesture scheme supported by the system uses a two fingers gesture. This gesture is particularly useful when considering the need to control the pressure level with continuous values. The pressure level is proportional to the amount of space between two fingers. The closer the fingers are, the smaller the pressure level is. Two fingers kept pressed close together represent a pressure level of zero.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of operating a touch-screen device, the method comprising:
   detecting, by one or more processors, a first touch at a location on a touch-screen, wherein the touch-screen is able to detect a presence of the first touch but is not able to detect an amount of pressure being applied by the first touch;
   detecting, by one or more processors, a second touch on the touch-screen, the detected second touch occurring simultaneously with the first touch on the touch-screen, wherein the first touch is performed by a first hand of a user touching the touch-screen, wherein the second touch is performed by a second hand of the user touching the touch-screen, wherein the first hand of the user draws a line on the touch-screen, wherein the second hand of the user controls a thickness of the line drawn on the touch-screen by the first hand;
   calculating, by one or more processors, a calculated pressure for the first touch based, at least in part, on a value corresponding to a feature of the detected second touch;
   adjusting, by one or more processors, the thickness of the line drawn on the touch-screen according to the pressure level determined by:

Pressure level=$(A*(C-1))+B$ where A is a chosen maximum number of fingers involved on either the first hand or the second hand in drawing a line on the touch-screen, B is a quantity of fingers from the second hand used to adjust a thickness of the line drawn on the touch-screen, and C is a quantity of fingers from the first hand used to draw a line on the touch-screen; and
      generating, by one or more processors, a touch-screen output according to the location of and calculated pressure for the detected first touch.

2. The method according to claim 1, wherein the feature of the detected second touch is an area of the touch-screen that is touched by the detected second touch, and wherein said calculating the pressure from the detected second touch comprises generating the calculated pressure from the area of the touch-screen that is touched by the detected second touch.

3. The method according to claim 1, wherein the feature of the detected second touch is a distance between the detected second touch and the first touch, and wherein said calculating the pressure from the detected second touch comprises generating the calculated pressure from the distance between the detected second touch and the first touch.

4. The method according to claim 1, wherein said calculating the pressure from the detected second touch comprises selecting a pressure level from a set of predefined pressure levels that is associated with the second touch, wherein the second touch is applied by multiple fingers of a user, and wherein each additional finger used to apply the second touch increases the calculated pressure by a discrete stepping level.

5. The method according to claim 1, further comprising:
   detecting a change in a nature of the detected second touch on the touch-screen, wherein the change in the nature of the detected second touch is identified by a change in an amount of area on the touch-screen being simultaneously touched; and
   re-calculating the pressure from a changed second touch based on a detected change in the nature of the detected second touch.

6. A touch-screen device comprising a touch-screen and a processor connected to the touch-screen, the processor arranged to:
   detect a first touch at a location on the touch-screen;
   detect a second touch on the touch-screen, the detected second touch occurring simultaneously with the first touch on the touch-screen, wherein the first touch is performed by a first hand of a user touching the touch-screen, wherein the second touch is performed by a second hand of the user touching the touch-screen, wherein the first hand of the user draws a line on the touch-screen, wherein the second hand of the user controls a thickness of the line drawn on the touch-screen by the first hand;
   calculate a pressure of the detected second touch to generate a calculated pressure of the detected second touch;
   adjust the thickness of the line drawn on the touch-screen according to the pressure level determined by:

Pressure level=$(A*(C-1))+B$ where A is a chosen maximum allowable number of fingers involved on the first hand in drawing a line on the touch-screen, B is a quantity of fingers from the second hand used to adjust a thickness of the line drawn on the touch-screen, and C is a quantity of fingers from the first hand used to draw a line on the touch-screen; and
      generate a specific touch-screen output according to the location and assigned calculated pressure of the detected first touch.

7. The device according to claim 6, wherein the processor is further arranged, when calculating the pressure of the detected second touch, to generate the calculated pressure from a magnitude of the detected second touch.

8. The device according to claim 6, wherein the processor is further arranged, when calculating the pressure of the detected second touch, to generate the calculated pressure from a distance from the detected second touch to the first touch.

9. The device according to claim 6, wherein the processor is further arranged, when calculating the pressure of the detected second touch, to select a pressure level from a set of predefined pressure levels.

10. The device according to claim 6, wherein the processor is further arranged to detect a change in a nature of the detected second touch on the touch-screen and re-calculate the pressure of a changed second touch.

11. A computer program product for operating a touch-screen device, the computer program product comprising a non-transitory computer readable storage medium having program code embodied therewith, the program code readable and executable by a processor to perform a method comprising:
   detecting a first touch on a touch-screen;
   detecting a second touch on the touch-screen, the detected second touch occurring simultaneously with the first touch on the touch-screen, wherein the first touch is performed by a first hand of a user touching the touch-screen, wherein the second touch is performed by a second hand of the user touching the touch-screen, wherein the first hand of the user draws a line on the touch-screen, wherein the second hand of the user controls a thickness of the line drawn on the touch-screen by the first hand;

calculating a simulated pressure from the detected second touch;

adjusting the thickness of the line drawn on the touch-screen according to the pressure level determined by:

$$\text{Pressure level} = (A*(C-1))+B$$

where A is a chosen maximum allowable number of fingers involved on the first hand in drawing a line on the touch-screen, B is a quantity of fingers from the second hand used to adjust a thickness of the line drawn on the touch-screen, and C is a quantity of fingers from the first hand used to draw a line on the touch-screen; and generating a specific touch-screen output according to a location and assigned simulated pressure of the detected first touch.

12. The computer program product according to claim 11, wherein the method further comprises:
generating the calculated pressure from a magnitude of the detected second touch.

13. The computer program product according to claim 11, wherein the method further comprises:
generating the calculated pressure from a distance between the detected second touch and the first touch.

14. The computer program product according to claim 11, wherein said calculating a pressure from the detected second touch further comprises selecting a pressure level from a set of predefined pressure levels.

15. The computer program product according to claim 11, wherein the method further comprises:
detecting a change in a nature of the detected second touch on the touch-screen and re-calculating the pressure from a changed second touch.

* * * * *